US006678879B1

(12) United States Patent
Hawse et al.

(10) Patent No.: US 6,678,879 B1
(45) Date of Patent: Jan. 13, 2004

(54) METHOD AND APPARATUS FOR AUTOMATED DESIGN OF INTEGRATED CIRCUITS

(75) Inventors: Alan R. Hawse, Georgetown, KY (US); Dragomir Nikolic, Lexington, KY (US); Jarrod V. Brooks, Lexington, KY (US); James D. Merchant, Starkville, MS (US); Risto D. Bell, San Jose, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 529 days.

(21) Appl. No.: 09/585,681

(22) Filed: Jun. 1, 2000

Related U.S. Application Data

(60) Provisional application No. 60/137,246, filed on Jun. 2, 1999.

(51) Int. Cl.[7] .............................................. G06F 17/50

(52) U.S. Cl. .............................................. 716/21; 716/5

(58) Field of Search ................................ 716/1, 2, 4, 5, 716/19, 20, 21

(56) References Cited

U.S. PATENT DOCUMENTS 5,923,563 A * 7/1999 Lavin et al. ................ 364/488
6,237,133 B1 * 5/2001 Suzuki ........................ 716/19
6,249,904 B1 * 6/2001 Cobb .......................... 716/21
6,370,679 B1 * 4/2002 Chang et al. ................. 716/19

* cited by examiner

*Primary Examiner*—Leigh M. Garbowski
(74) *Attorney, Agent, or Firm*—Christopher P. Maiorana, P.C.

(57) ABSTRACT

A design tool, comprising a pattern injection tool configured to automatically allow for the inclusion of dummy structures, differential feature sizing and/or serif addition into integrated circuit (IC) designs, in a pre-processing stage.

20 Claims, 3 Drawing Sheets

100

102 DESIGN DATABASE

104 PATTERN INJECTION TOOL (GENERATES OVERLAYS FOR (LAYER) DUMMY STRUCTURES EVEN WHERE NOT NEEDED)

106 DESIGN TOOL

112 LANGUAGE

114 COMPILER (COMPILE MACRO-INSTR. TO ALLOW FOR DIFFERENTIAL SIZING EFFECTS)

116 DESIGN RULES

108 VERIFICATION TOOL

110 MASK DATA

METHOD AND APPARATUS FOR AUTOMATED DESIGN OF INTEGRATED CIRCUITS

This application claims the benefit of U.S. Provisional Application No. 60/137,246, filed Jun. 2, 1999 and is hereby incorporated by reference in its entirety.

FIELD OF THE INVENTION

The present invention relates to a method and/or architecture for the design of integrated circuits generally and, more particularly, to a method and/or architecture for the automated design of integrated circuits.

BACKGROUND OF THE INVENTION

Referring to FIG. 1, an example of a conventional design system 10 is shown. The system 10 generally comprises a database design block 12, a design rules block 14, a verification tool block 16 and a mask data block 18. Conventional approaches for the design of integrated circuits have relied on the use of design verification tools provided by vendors such as Cadence, Mentor Graphics, Avant!, etc. A designer produces a design for the integrated circuitry in a language recognizable by the design verification tool 16. The design verification tool 16 is run according to certain design rules. The design rules are typically process technology dependent. The output of the tool verification block 16 is the mask data 18 that conforms to the applicable design rules for a given technology.

Unfortunately, before the designer is able to submit the design database to the verification tool block 16, corrections to the design to account for various photolithographic effects and/or process effects must be made. For example, the proximity of features as laid out affects the sizing of those features. For instance, polysilicon lines (e.g., for gate structures, etc.) may "grow" or "shrink" when actually laid out, due primarily to the proximity of other nearby features/lines. Also, serifs may ensure that line/feature lengths are not exceeded when the lines/features are laid out. Corrections must be made for such effects.

Accordingly, in the past designers modified the "as drawn" designs to account for differential sizing and other effects. Some vendors, such as Microunity Systems Engineering, provided post-processing tools that allowed for the introduction of serif structures following the design rule verification step. However, such tools often require significant memory storage capabilities and significant processing time (e.g., on the order of several days to complete).

In addition, certain processing steps, such as chemical-mechanical polishing (CMP), affect the various areas of ICs differently, depending on the density of underlying features. In particular, CMP tends to erode the portions of the dielectric disposed over areas with less feature density to a greater extent than the portions of the dielectric disposed over areas of higher feature density. As a result, non-uniform wafer surfaces may be produced by the polishing processes. The non-uniform wafer surfaces can be corrected by the insertion of "dummy features" in areas of the IC (particularly the periphery) where fewer active features are located. Some approaches to inserting dummy features to date have included:

(1) designers laying out the dummy features themselves (i.e., designing in the dummy features), or (2) painting dummy features over the entire IC layout and having the design verification tool remove any unwanted dummy features (leading to increased processing time and additional memory storage).

SUMMARY OF THE INVENTION

The present invention concerns a design tool, comprising a pattern injection tool configured to automatically allow for the inclusion of dummy structures, differential feature sizing and/or serif addition into integrated circuit (IC) designs, in a pre-processing stage.

The objects, features and advantages of the present invention include providing a method and/or architecture for automated design of integrated circuits (IC) that may (i) provide an automated design process for ICs, (ii) provide automatic implementation of formats suitable for fabrication, (iii) provide automatic implementation of dummy structures, differential sizing and/or serif addition, (iv) provide hierarchical pattern injection, (v) allow a designer to draw circuitry as desired at a design stage, (vi) reduce memory requirements, (vii) reduce processing time, and/or (viii) reduce or eliminate post processing techniques.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
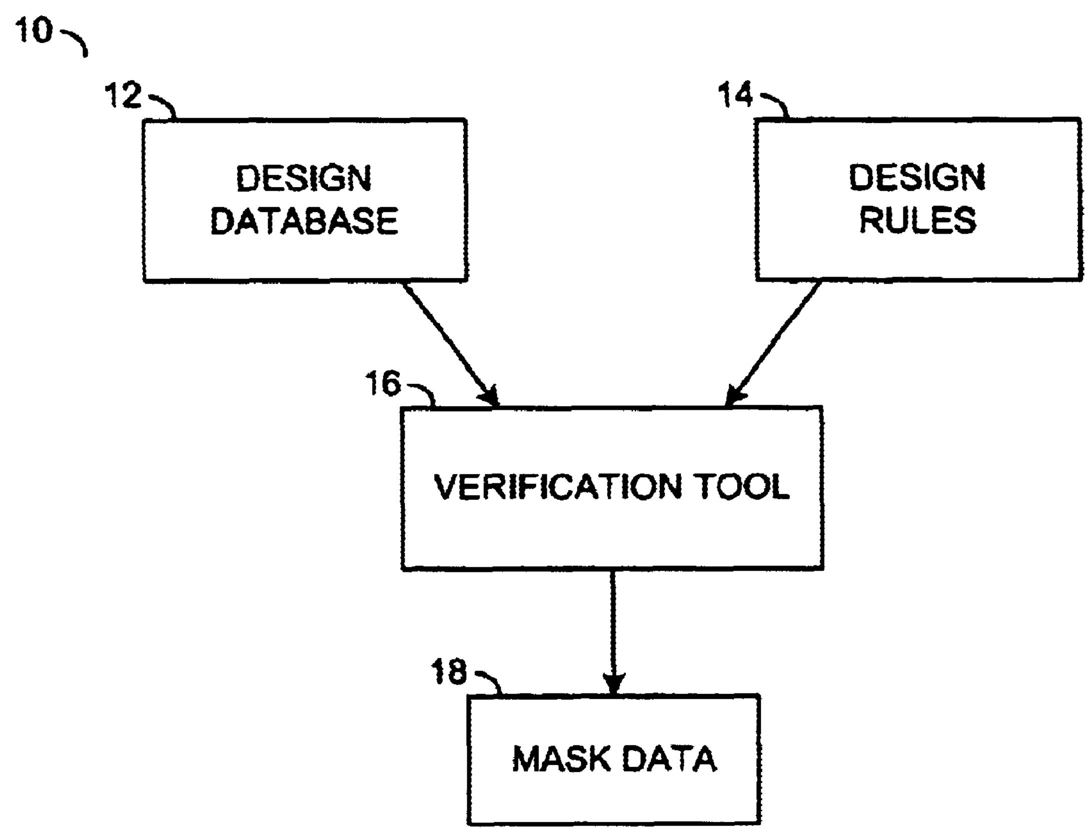
FIG. 1 is a block diagram of a conventional method for circuit design.
Figure 2:
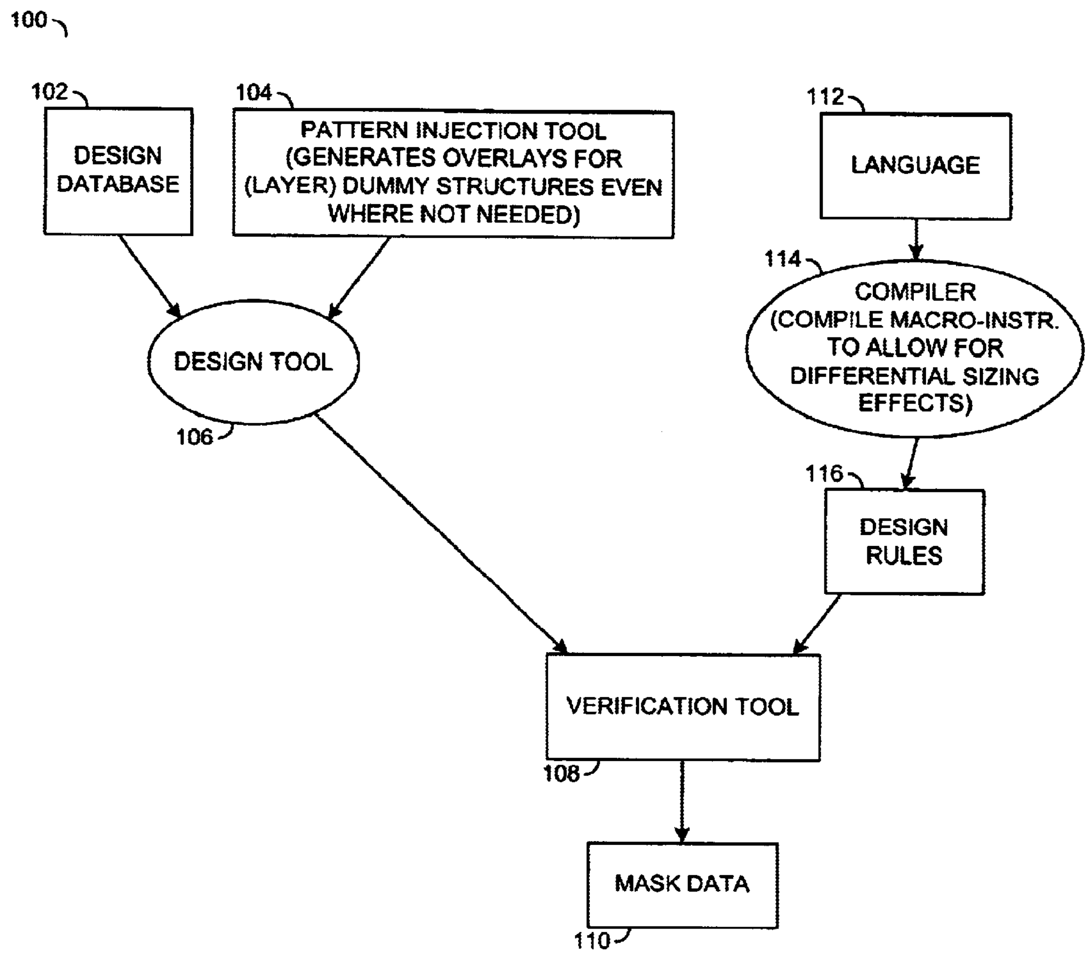
FIG. 2 is a block diagram of a preferred embodiment of the present invention.

Referring to FIG. 2, a block diagram of a system 100 is shown in accordance with a preferred embodiment of the present invention. The system 100 generally comprises a design database block 102, a pattern injection tool block 104, a design tool block 106, a verification tool 108, a mask data block 110, a language block 112, a compiler block 114 and a design rules block 116.

The system 100 may provide an automated process for a designer to "draw what he/she wants" in terms of circuitry for an integrated circuit (IC). The system 100 may automatically provide a particular design implemented in a format suitable for fabrication. The implemented format may include any necessary waffling (e.g., insertion of dummy features), differential sizing of features and addition of serifs required to accommodate optical proximity effects/corrections and processing effects/corrections.

The system 100 automates the inclusion of dummy structures, differential sizing and serif addition processes into IC designs, in a pre-processing stage, allowing the designer to draw the circuitry as desired at the design stage. Because the present scheme allows for the use of hierarchical pattern injection, memory requirements are reduced over previous schemes. Processing time is also reduced over post-processing methods.

The pattern injection tool 104 may generate overlays for insertion of dummy structures. The pattern injection tool 104 may generate overlays for (layer) dummy structures even where not needed. In one example, the design database may be implemented as a drawn design database. The verification tool 108 may be implemented, in one example, as a design verification tool. In one embodiment, the verification tool 108 may add serifs. In another embodiment, the verification tool 108 may add dummy features. Allowing the verification tool 108 to add the dummy features may improve processing times in some embodiments. Additionally, the verification tool 108 may be implemented to perform differential sizing.

The present invention employs a unique pattern injection tool 104 that may allow dummy features to be added to an IC design layout. The dummy features may allow the IC to achieve an uniform density of feature structure, thereby helping to reduce or eliminate the effects of non-uniform processing and photolithographic effects that might otherwise occur.

In addition, a novel high-level design rule command language 112 and associated compiler 114 may allow for the use of macro-instructions to specify design rules for design verification. The macro-instructions may allow for the automated introduction of differential sizing effects and the addition of serifs. In particular, the circuit designer is no longer faced with the challenge of accounting for differential sizing and serifs in the "as drawn" design.

In essence, the system may provide a bridge between the circuit designer and the process engineer. The designer may draw a circuit layout corresponding to the desired design. The drawn designs may be processed according to the methods of the present invention to automatically account for dummy feature insertion, differential sizing and the addition of serifs. The resulting mask data 110 may be used directly by the mask-making facility, without the need for time consuming post-processing techniques required in the past.

Pattern injection (e.g., via the pattern injection tool 104 to account for waffling) may be accomplished in a manner that may make use of the hierarchical nature of the existing design data. Rather than "flattening" the data, the dummy features are represented in the hierarchical fashion of the existing design, allowing the design verification tools to make use of the feature hierarchy. The system 100 may reduce memory requirements for the design verification tool 108. The system 100 may also reduce processing time. The pattern injection tool 104 is generally permitted to examine the design database block 102 in order to locate areas of reduced feature density. Dummy patterns may be injected into the reduced density areas (e.g., using the hierarchical data descriptions) to achieve uniform feature density in the final layout. The dummy patterns may be introduced in such a way as to account for the addition of serifs, etc. at later stages. The dummy patterns may be implemented such that there may be no interaction between the dummy features and any active features in the final layout.

The high level command language 112 and the related compiler 114 generally provide design rules in the target design verification tool 108 language to account for differential sizing effects and serif addition. The compiler 114 and command language 112 generally relieve the designer from the burden of having to account for the differential sizing effects and serif addition during the design process. The system 100 may allow design data to be introduced in a hierarchical fashion, in order to reduce memory requirements and processing time.

The compiler 114 may be implemented as a set of computer-readable instructions (e.g., a program or process, usually embodied on a computer-readable medium although it may be distributed as electronic information across a local area network, a wide area network or a network of networks, such as the Internet, in which case it may, at least temporarily, exist as a series of information elements (e.g., bits) in a digital data transmission system or as analog signals (e.g., voltage or current levels) in an analog transmission system such as a local loop of a telephone network) that may compile the high level source rules 116 into flattened output rules. The flat rules may refer to a rules file that may be stand alone, and in some cases may be executed by conventional design verification tools (e.g., the Vampire tool available from Cadence). In one example, the flat rules may correspond to the skill language syntax developed by Cadence. Thus, the compiler 114 generally allows the use of the present high level design rule language 112 with existing tools as well as with the design verification tool 108.

The compiler 114 generally maintains independence and separability of the run-time rules of the verification tool 108 from the design flow to a degree. Whether or not derived at run-time, a flat (e.g., source) rule file for any verification run is available, and may have the design flow technology references already resolved. The system 100 may help to accommodate code reuse in any technology to maintain consistency across different technologies. As a practical matter, in one embodiment, the compiler 114 and all design rules files may flow. Additionally, on-line access through a compiler library is possible.

The high level design rules block 116 refer to a file that may represent the verification rules at a higher level of abstraction that are ultimately compiled into the flat rules for the design verification tool 108. The source rules may be understandable by humans (as well as by the compiler), making the design and verification process easier. Many of the statements and constructs may have clear correspondence to capabilities of the underlying design verification tool.

Figure 3:
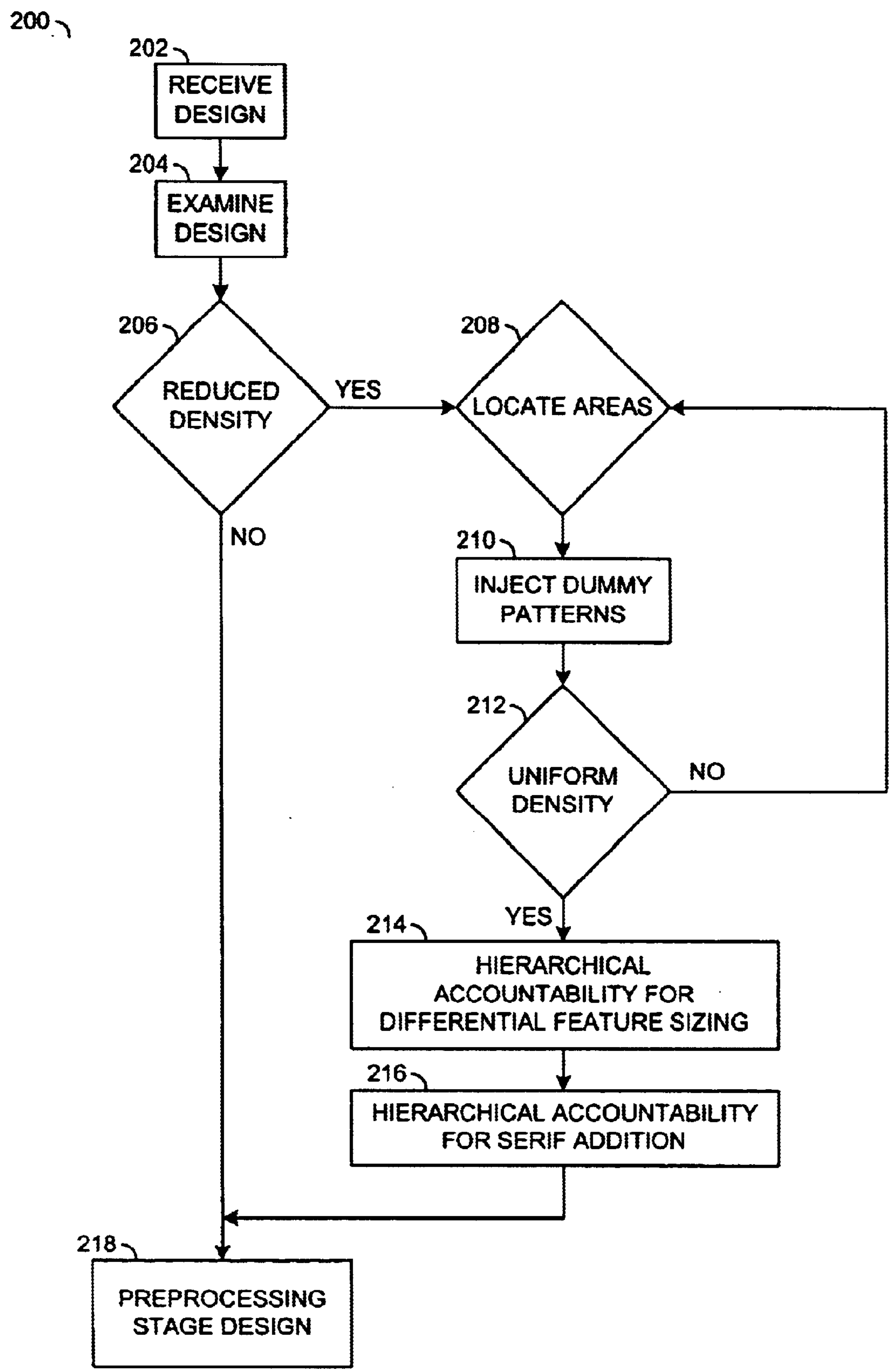
FIG. 3 is a block diagram illustrating an operation of the present invention.

Referring to FIG. 3, a system (or process) 200 illustrating an operation of the pattern injection tool 104 is shown. The system 200 generally comprises a block (or state) 202, a block (or state) 204, a decision block (or state) 206, a decision block (or state) 208, a block (or state) 210, a decision block (or state) 212, a block (or state) 214, a block (or state) 216 and a block (or state) 218. The system 200 may be implemented to provide a preprocessing stage of an IC design. The block 202 may receive a circuit design. The circuit design may be an IC layout, hierarchical design or other appropriate design. The block 204 may examine the circuit design (via the block 202). The decision block may determine a density of the circuit design. The decision block 206 may determine areas of reduced density within the circuit design. If the design has areas of reduced density the system 200 generally proceeds to the decision block 208.

The decision block 208 may locate the areas of reduced density. The located areas of reduced density may be passed to the block 210. The block 210 may inject dummy patterns into the areas of reduced density. The block 210 may be implemented to provide a uniform density of the circuit design. The system 200 may proceed to the decision block 212.

The decision block 212 may determine if the design has a uniform density. If the design does not have an uniform density the system 200 may continue to the block 208 in order to locate a next area of reduced density. If the design has an uniform density the system 200 may proceed to the block 214. The block 214 may provide hierarchical accountability for later differential feature sizing. The system 200 may then proceed to the block 216. The block 216 may provide hierarchical accountability for later serif addition. The system 200 may then continue to the block 218.

Additionally, if the circuit design does not have areas of reduced density, the block 206 may proceed directly to the block 218. The block 218 may present a fully conditioned preprocessing stage circuit design. The final preprocessing design may allow the circuit 100 to automatically account for inclusion of dummy structures, differential feature sizing and/or serif addition.

While the invention has been particularly shown and described with reference to the preferred embodiments thereof, it will be understood by those skilled in the art that various changes in form and details may be made without departing from the spirit and scope of the invention.

What is claimed is:

1. A design tool, comprising:

a pattern injection tool configured to automatically generate a plurality of overlays for a design of an integrated circuit;

a compiler configured to generate a plurality of rules in response to compiling a plurality of macro-instructions; and a verification tool configured to (i) add a plurality of dummy features to said design in response to said overlays and (ii) add a plurality of serifs to said design in response to said rules.

2. The design tool of claim 1, wherein said pattern injection tool is further configured to allow for said overlays to be added to said design to achieve a substantially uniform density of feature structures.

3. The design tool of claim 1, wherein said macro-instructions comprise a high-level design rule command language for use during design verification of said designs.

4. The design tool of claim 3, wherein said rules comprise a source rule file understandable by a human and said compiler.

5. The design tool of claim 3, wherein said macro-instructions allow for an automated introduction of differential sizing effects to said design.

6. The design tool of claim 1, further comprising a design database coupled to said verification tool and configured to store said design.

7. The design tool of claim 6, wherein said design comprises an hierarchical design.

8. The design tool of claim 6, wherein said pattern injection tool is further configured to examine said design database to locate areas of reduced feature density.

9. The design tool of claim 8, wherein said pattern injection tool is further configured to inject said overlays into said areas of reduced feature density.

10. The design tool of claim 9, wherein said pattern injection tool is further configured to account for an addition of said serifs.

11. The design tool of claim 1, wherein said verification tool is further configured to generate mask data.

12. The design tool of claim 11, wherein said mask data comprises a format suitable for fabrication.

13. The design tool of claim 11, wherein said verification tool is further configured to perform differential sizing in said design.

14. A method for designing an integrated circuit (IC) comprising the steps of:

(A) automatically generating a plurality of overlays for a design of said integrated circuit (B) adding a plurality of dummy features to said design in response to said overlays;

(C) generating a plurality of rules in response to compiling a plurality of macro-instructions; and (D) adding a plurality of serifs to said design in response to said rules.

15. The method of claim 14, wherein said rules account for differential sizing effects and the method further comprises the step of performing differential sizing in said design in response to said rules.

16. The method of claim 14, further comprising the step of:

compiling said macro-instructions from a high-level design rule command language into said rules for use during verification of said design.

17. The method of claim 14, wherein step (A) further comprises the sub-steps of:

examining said design to locate a plurality of areas of reduced feature density; and injecting said overlays for said dummy features into said areas of reduced feature density.

18. The method of claim 14, wherein said injecting is made using hierarchical data descriptions.

19. A computer-readable medium containing instructions configured to execute the steps of claim 14.

20. A tool comprising means for automatically generating a plurality of overlays for a design of an integrated circuit;

means for inserting a plurality of dummy features into said design in response to said overlays;

means for generating a plurality of rules in response to compiling a plurality of macro-instructions; and means for adding a plurality of serifs to said design in response to said rules.

* * * * *